J. E. RILLING.
VEHICLE SEAT.
APPLICATION FILED OCT. 17, 1917.
1,263,703. Patented Apr. 23, 1918.
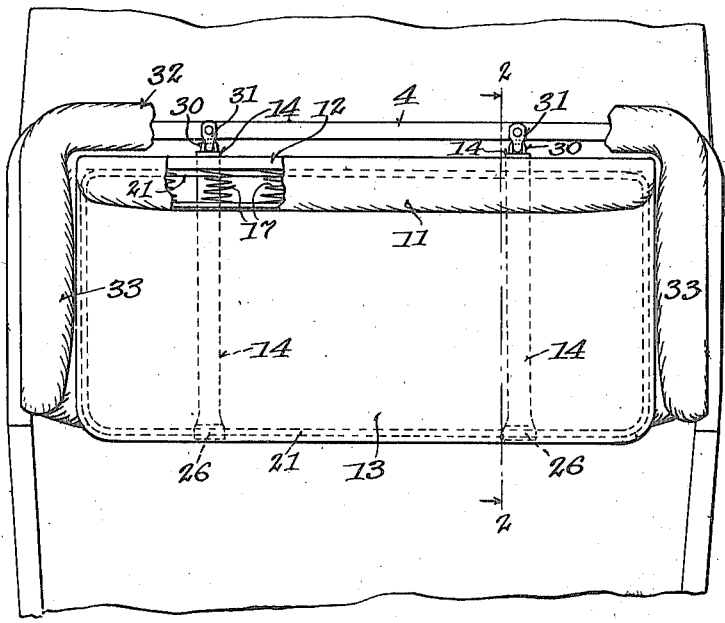
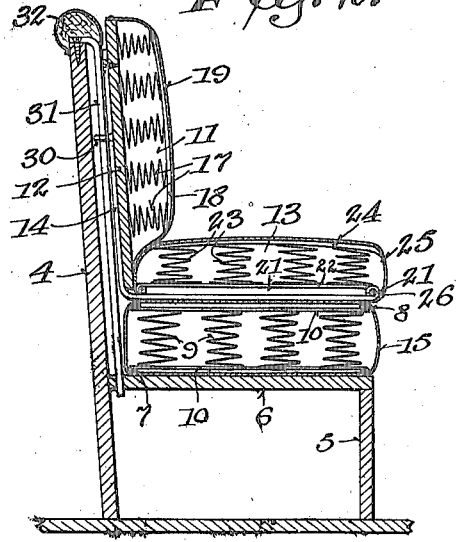
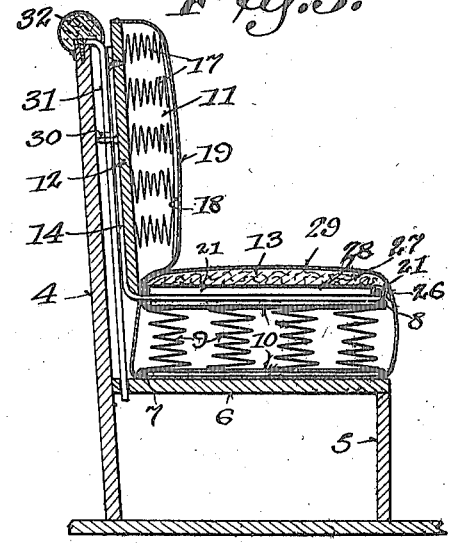
Inventor
John E. Rilling
By Morsell, Keeney & French
Attorneys.

UNITED STATES PATENT OFFICE.

JOHN E. RILLING, OF MILWAUKEE, WISCONSIN.

VEHICLE-SEAT.

1,263,703.	Specification of Letters Patent.	Patented Apr. 23, 1918.

Application filed October 17, 1917. Serial No. 197,040.

*To all whom it may concern:*

Be it known that I, JOHN E. RILLING, a citizen of the United States, and resident of Milwaukee, in the county of Milwaukee and State of Wisconsin, have invented new and useful Improvements in Vehicle-Seats, of which the following is a description, reference being had to the accompanying drawings, which are a part of this specification.

The invention is more particularly designed to provide a spring seat for automobiles or other vehicles.

Heretofore it has been customary to secure the cushions forming the seat and back of the seat to the frame of the seat so that the shock occasioned by the vehicle passing over obstructions was taken up by the spring cushion beneath the seat but the occupant of the seat was bounced about by the spring cushion and his back frictionally engaging the seat back prevented his free movement with the seat and thus subjected him to shocks and jolts. To overcome this difficulty I have provided a construction in which the seat and back are secured together and supported upon the spring cushion and in which the seat and back may move together with respect to the seat frame so that when the spring cushion moves up and down through shocks occasioned by the vehicle passing over obstructions, the seat and back carrying the occupant move up and down as a unit.

The invention further consists in the several features hereinafter set forth.

In the drawings:

Figure 1 is a plan view of the seat embodying the invention, parts being broken away;

Fig. 2 is a section taken on the line 2—2 of Fig. 1;

Fig. 3 is a vertical sectional view showing a modified construction of seat.

In general the construction consists of a seat frame, a spring cushion mounted thereon, and a combined seat and back carried by the spring cushion and vertically slidably mounted upon the seat frame.

The seat frame may be of any suitable construction and in the drawings I show it formed by upright frame members 4 and 5 and a bottom seat member 6.

The spring cushion may be of any suitable construction and in the drawings I show it formed of a lower frame 7 and upper marginal frame 8 and a plurality of springs 9 interposed between the frames 7 and 8 and secured to them and to strips of webbing 10 to form the cushion.

The combined seat and back consists of a back cushion 11 mounted upon the seat back 12 and a seat cushion 13, said parts being secured together to form a unitary structure by means of spaced apart angled bars 14 extending along the back 12 to which they are secured, and along the bottom of the seat cushion to which they are secured.

In Figs. 1 and 2 of the drawings I show the spring cushion provided with an outer casing 15 said cushion being removable, from the seat and I also show the cushion 11 as a spring cushion having springs 17 therein secured to the seat back 12 and to webbing 18 and covered over with a covering 19 and the cushion 13 as a spring cushion having a lower marginal frame 21, webbing 22, springs 23 secured to said webbing and to webbing 24 which is covered over by the covering 25. The forward ends 26 of the bars 14 are bent over the lower frame 21 and said bars 14 and frame 21 form a skeleton frame between the spring cushion and the seat cushion.

The construction thus far described is similar to that shown in Fig. 3 except that in this instance the seat cushion is formed of padding 27 mounted upon a fabric support 28 carried by the frame 21 and the covering 29 passes over the padding 27 and the lower spring cushion which is not removable, or I may use a spring cushion instead of the padding 27 and have the covering 29 pass over it as shown in Fig. 3.

In both constructions the back portions of the angled bars 14 each carry a staple 30 which is slidably mounted upon a guide rod 31 extending from the top of the seat frame down into the seat member 6. While several staples might be used on each bar I prefer to use a single staple so the seat may be permitted to have a limited tipping movement in a vertical plane. This loose connection between the seat and the guides to permit lateral tipping or tilting is important as when one person is seated on one side of the seat with the weight on this side, or when several persons are seated on the seat and the live weight is shifted to one side of the seat in turning a corner at a fair rate of speed, this application of weight to one side of the seat will naturally cause the springs supporting this weight to go down while the other springs will not and thus to permit this action taking place properly the seat must be permitted to tilt. In case the seat and back are guided in a straight vertical path without provision for tilting, the weight acting upon one side of the seat will cause the opposite side to bind against the guide with the result that the seat will not move down properly and the occupants will therefore be subjected to shocks which are eliminated by the loose connection of the seat and the guides.

In view of the fact that the bars 14 are connected at or near their ends to the seat frame they will readily resist side pressure imposed upon them by the staples 30 when the seat tilts.

In case the seat is a double seat and a spring cushion is used for the seat cushion 13 the bars 14 are disposed intermediate of the cushion as shown in Fig. 1. In case the seat is a double seat and a padded cushion is used as shown in Fig. 3, the bars 14 are preferably disposed at the ends of said padded cushion. In the case of a single seat only one bar 14 need be used disposed centrally of the back and seat.

With the construction shown in Fig. 2 the spring cushion 13 yields under the natural weight imposed upon it by the occupant or occupants and the spring cushion upon the seat frame yields under shocks, the springs 9 being of greater strength than the springs 23.

With both of these constructions it will be noted that the seat constitutes practically all one cushion with the pair of frame bars 14 interposed between them so that practically the only weight that the seat springs have to take care of is the live load imposed upon them. If the seat cushions were mounted upon a solid or a heavy seat frame the lower springs would have to take care of the dead load of the seat in addition to the live load imposed upon them and would therefore have to be stiffer and slower acting and consequently the springs would not be flexible enough to accommodate the live load properly with the result that the occupants would be subjected to shocks.

In the drawings I have shown the seat frame as provided with upholstered top portions 32 and side portions 33.

With the constructions above described when the vehicle passes over obstructions and the spring cushion moves up and down the whole seat and back carrying the occupant moves up and down as a unit and prevents jarring the occupant, the staples 30 on the back of the seat sliding up and down upon the guide rods 31 and tilting where the weight is unequally distributed over the seat as previously described.

I am aware that the details of construction of the spring cushion and the other parts of the device are subject to some modification and change and I therefore desire it to be understood that such changes as come within the scope of the appended claims I deem to be within the spirit of my invention.

What I claim as my invention is:

1. In a seat construction, the combination, with a seat frame provided with side arms, of a spring cushion mounted thereon, a cushioned unitary seat and back mounted upon said spring cushion to move with it, and means for guiding the unitary seat and back in its up and down movement and for permitting lateral tilting thereof when the weight imposed upon the seat is unevenly distributed.

2. In a seat construction, the combination, with a seat frame provided with side arms, of a spring cushion mounted thereon, a unitary seat and back cushion frame including a skeleton seat frame resting upon said spring cushion to permit the spring cushion to be responsive to the live load imposed upon it, cushions mounted on the back and seat portions of said unitary frame, and means for guiding said unitary seat and back in its movement with the spring cushion with respect to the seat frame.

3. In a seat construction, the combination, with a seat frame, of a spring cushion mounted thereon, a unitary seat and back supported upon said spring cushion to move with it, guide rods secured at their ends to said seat frame, and means secured to the back of said unitary seat and back and loosely engaging said guide rods to provide for the up and down and tilting movement of said unitary seat and back with respect to said frame.

4. In a seat construction, the combination, with a seat frame provided with side arms, of a spring cushion mounted thereon, a seat cushion, a back cushion, a unitary seat and back cushion frame to which said seat and back cushions are secured to form a cushioned unitary seat and back, said unitary seat and back being supported upon the spring cushion and the seat cushion frame being so constructed as to allow the springs of the spring cushion to be readily responsive to the live load imposed upon them through the seat cushion, and means for guiding and permitting tilting of said unitary seat and back with respect to said seat frame.

In testimony whereof I affix my signature.

JOHN E. RILLING.